United States Patent
Hallock et al.

(10) Patent No.: US 11,325,515 B2
(45) Date of Patent: May 10, 2022

(54) SEAT ASSEMBLY AND SEAT PORTION

(71) Applicant: Lear Corporation, Southfield, MI (US)

(72) Inventors: Joshua Hallock, Warren, MI (US); Ike Syed, Royal Oak, MI (US); Michael Corvino, Canton, MI (US); Rahul A. Kshirsagar, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 62 days.

(21) Appl. No.: 16/786,184

(22) Filed: Feb. 10, 2020

(65) Prior Publication Data
US 2021/0245641 A1    Aug. 12, 2021

(51) Int. Cl.
*B60N 2/90* (2018.01)
*B60N 2/68* (2006.01)
*B60N 2/58* (2006.01)

(52) U.S. Cl.
CPC .......... *B60N 2/986* (2018.02); *B60N 2/5825* (2013.01); *B60N 2/68* (2013.01)

(58) Field of Classification Search
CPC .... B60N 2/986; B60N 2/5825; B60N 2/5816; B60N 2/68
USPC ..................................................... 297/284.9
See application file for complete search history.

(56) References Cited

U.S. PATENT DOCUMENTS

| | | | |
|---|---|---|---|
| 5,988,757 A | 11/1999 | Vishey et al. | |
| 9,505,329 B2 | 11/2016 | Mori et al. | |
| 9,616,791 B2 | 4/2017 | Awata et al. | |
| 10,166,895 B2 | 1/2019 | Line et al. | |
| 10,328,830 B2 | 6/2019 | Duncan et al. | |
| 2011/0121624 A1* | 5/2011 | Brncick | B60N 2/6673 297/284.2 |
| 2014/0203610 A1* | 7/2014 | Line | B60N 2/0232 297/354.1 |
| 2015/0008716 A1* | 1/2015 | Dry | B60N 2/68 297/452.18 |
| 2018/0105085 A1* | 4/2018 | Duncan | B60N 2/58 |
| 2018/0319301 A1* | 11/2018 | Haby | B60N 2/6009 |
| 2020/0180480 A1* | 6/2020 | Hong | B60N 2/667 |
| 2020/0231075 A1* | 7/2020 | Roman | A47C 31/023 |

* cited by examiner

*Primary Examiner* — Mark R Wendell
(74) *Attorney, Agent, or Firm* — Fishman Stewart PLLC

(57) ABSTRACT

A seat assembly may include a seatback frame, a rear panel connected to the seatback frame, and a bolster body releasably connected to the rear panel. The bolster body may include a first portion, a second portion, and a third portion. The second portion may extend from a first side of the first portion. The third portion may extend from a second side of the first portion.

20 Claims, 15 Drawing Sheets

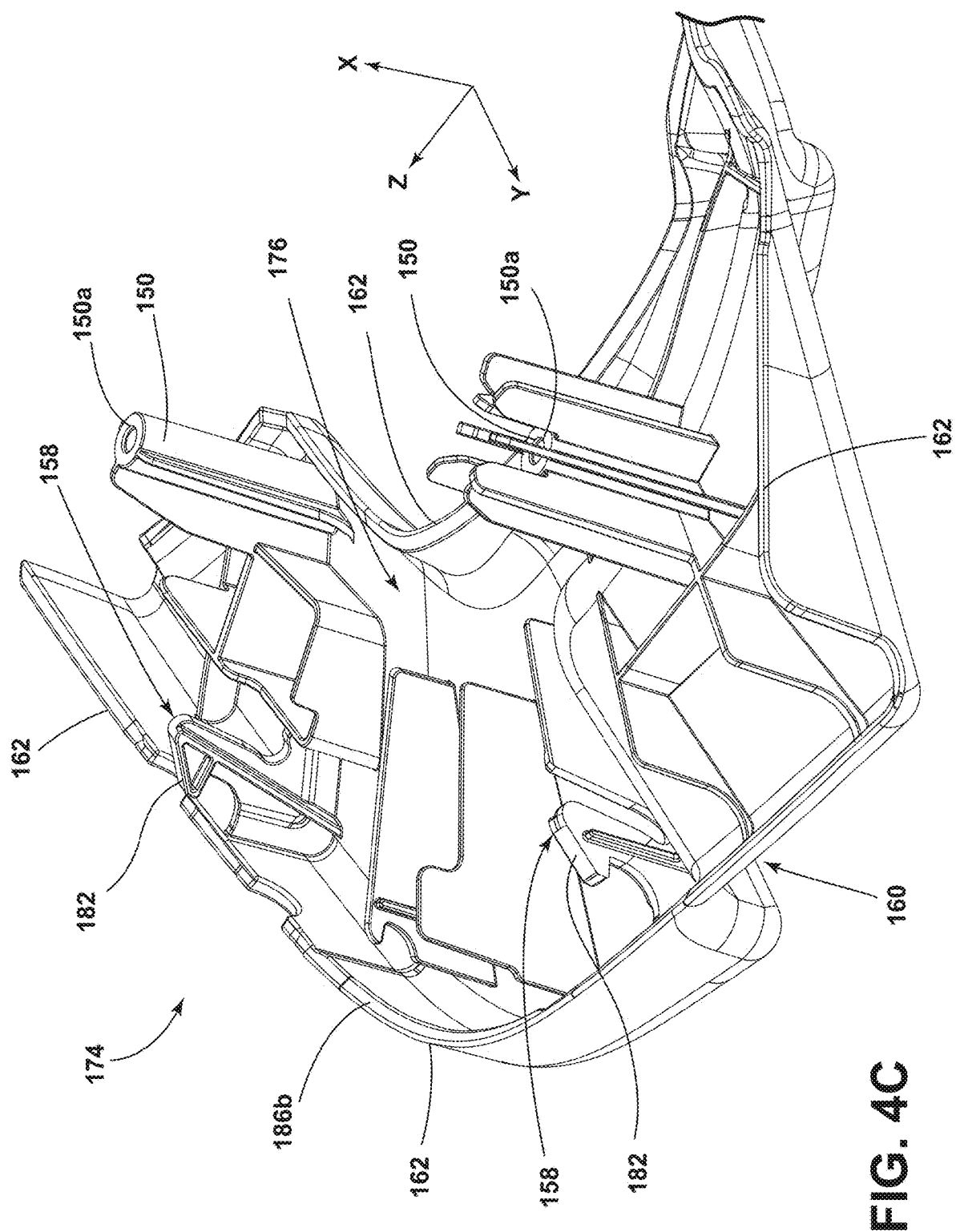

SEAT ASSEMBLY AND SEAT PORTION

TECHNICAL FIELD

The present disclosure generally relates to a seat assembly and a seat portion, including a modular seat assembly.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat assembly designs may be relatively complex, may include several different portions which may be difficult to assemble, and/or may have components or portions which deform or fail earlier than other components or portions of the seat assembly. For example, some components of seat assemblies may be mainly formed and/or composed of a foam material. Over time, the lack of rigidity in the foam material and the absence of a support structure may cause these foam components to deform, droop, and/or drop away from their desired original position leading to reduced functionality and appearance. As another example, some seat assemblies utilize Christmas tree-shaped push pins, which engage into corresponding recesses, to connect various seating components. However, these push pin connections are not user or manufacturing plant friendly as they can require high assembly efforts, may be difficult to locate during installation, and may increase the difficulty of installing further seat components once engaged in the corresponding recesses.

There is a desire for solutions/options that minimize or eliminate one or more challenges or shortcomings of the current seat assemblies and/or components or portions of such seat assemblies. The foregoing discussion is intended only to illustrate examples of the present field and is not a disavowal of scope.

SUMMARY

In embodiments, a seat assembly may include a seatback frame, a rear panel connected to the seatback frame, and a bolster body releasably connected to the rear panel. The bolster body may include a first portion, a second portion, and a third portion. The second portion may be connected to and/or extend from a first side of the first portion. The third portion may be connected to and/or extend from a second side of the first portion.

In embodiments, a seat portion may include a first portion, a second portion connected to a first end of the first portion, and a third portion connected to a second end of the first portion. The first portion, the second portion, and the third portion may collectively define a substantially U-shape bolster body releasably connectable to a seating component.

In embodiments, a method of assembling a seat assembly may include connecting an elevated portion to a rear panel. The elevated portion may include a clip recess. The method may include releasably connecting a bolster body to the rear panel via engaging a clip connected to the bolster body in the clip recess of the elevated portion. The method may include connecting the bolster body to the rear panel with a fastener. The bolster body may include a first portion, a second portion, and a third portion. The second portion may be connected to and/or extend from a first end of the first portion. The third portion may be connected to and/or extend from a second end of the second portion.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

FIGS. 4A, 4B, and 4C are a front view, a rear view, and an enlarged rear view, respectively, of a portion of an embodiment of a bolster body according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
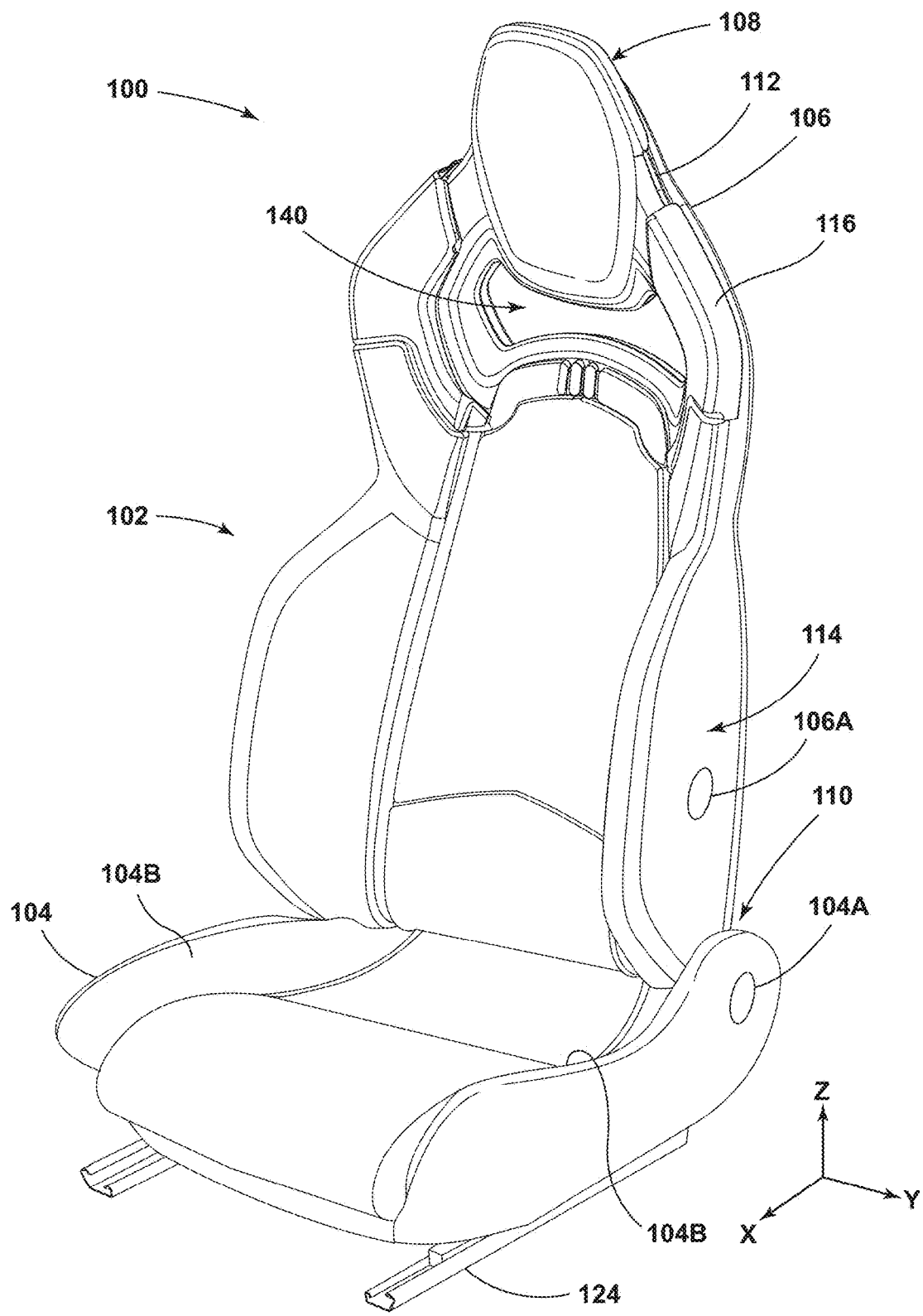
FIG. 1 is a perspective view generally illustrating an embodiment of a seat assembly according to teachings of the present disclosure.

In embodiments, such as illustrated in FIG. 1, a seat assembly 100 may be configured as a modular seat assembly that may include a plurality of components, elements, parts, etc. which, when assembled, may form a rear seat assembly or back seat assembly, such as for a passenger vehicle. In other examples, the seat assembly 100 may form some other seating system, mechanism, device, or assembly such as a front seat assembly, an intermediate row seat assembly, and/or other seat apparatus. A seat assembly 100 may, for example and without limitation, be used in conjunction with a passenger vehicle (e.g., cars, vans, SUVs, trucks, buses, trains, boats, ships, planes, etc.), and may be utilized in any other situation or apparatus where seating is desired, such as homes, office buildings, warehouse facilities, theaters, stadiums, recreational vehicles, commercial vehicles/equipment, agricultural vehicles/equipment, and/or roller coasters, among others.

With embodiments, a seat assembly 100 may include a plurality of seat portions and/or a plurality of seat components 102. For example, the seat assembly 100 may include a seat bottom 104 on which a user may sit, a seatback 106 against which a user may lean, such as when sitting on the seat bottom 104, and/or a headrest 108. In some examples, the seat assembly 100 may be a tombstone style seat where the headrest 108 is connected to the seatback 106 such that the position of the headrest 108 relative to the seatback 106 is not adjustable (e.g., fixed on the seatback 106) and/or is formed as a portion/section of the seatback 106.

In embodiments, the seat bottom 104 may be disposed adjacent to and/or may be connected to a lower region 110 of the seatback 106. The seat bottom 104 may be configured as a modular seat bottom that may include a plurality of components, elements, parts, etc. which, when assembled, may form the seat bottom 104. The seat bottom 104 may extend in a similar direction to the floor of a vehicle (e.g., in a direction substantially transverse to gravitational force). The firmness, position, and/or orientation of the seat bottom 104 relative to the seatback 106 or the vehicle floor may be adjustable via an adjustment mechanism 104A (e.g., a tilt lever, a height lever, a motor, etc.), which may allow a user to customize the configuration of the seat bottom 104. The seat bottom 104 may be of a generally rectangular, square, or trapezoidal shape, among other shapes, and may include rounded corners and/or edges. In some examples, the seat bottom 104 may include one or more seat bottom bolsters 104B which protrude therefrom (e.g., at an oblique angle), such as to guide a user to sit in a central region of the seat and/or to bias the user toward a designed seating position. The seat bottom bolsters 104B may have a wing-shape and may be a separate component from the seat bottom 104 or may be integrally formed with the seat bottom 104. The seat bottom 104 may be constructed or composed of one or more of a variety of materials, such as fabric, foam, metal, plastic, injection foam-in-place materials, and/or others. The seat bottom 104 may be any desired size and shape, and may be constructed from or composed of any desired material.

Figure 2:
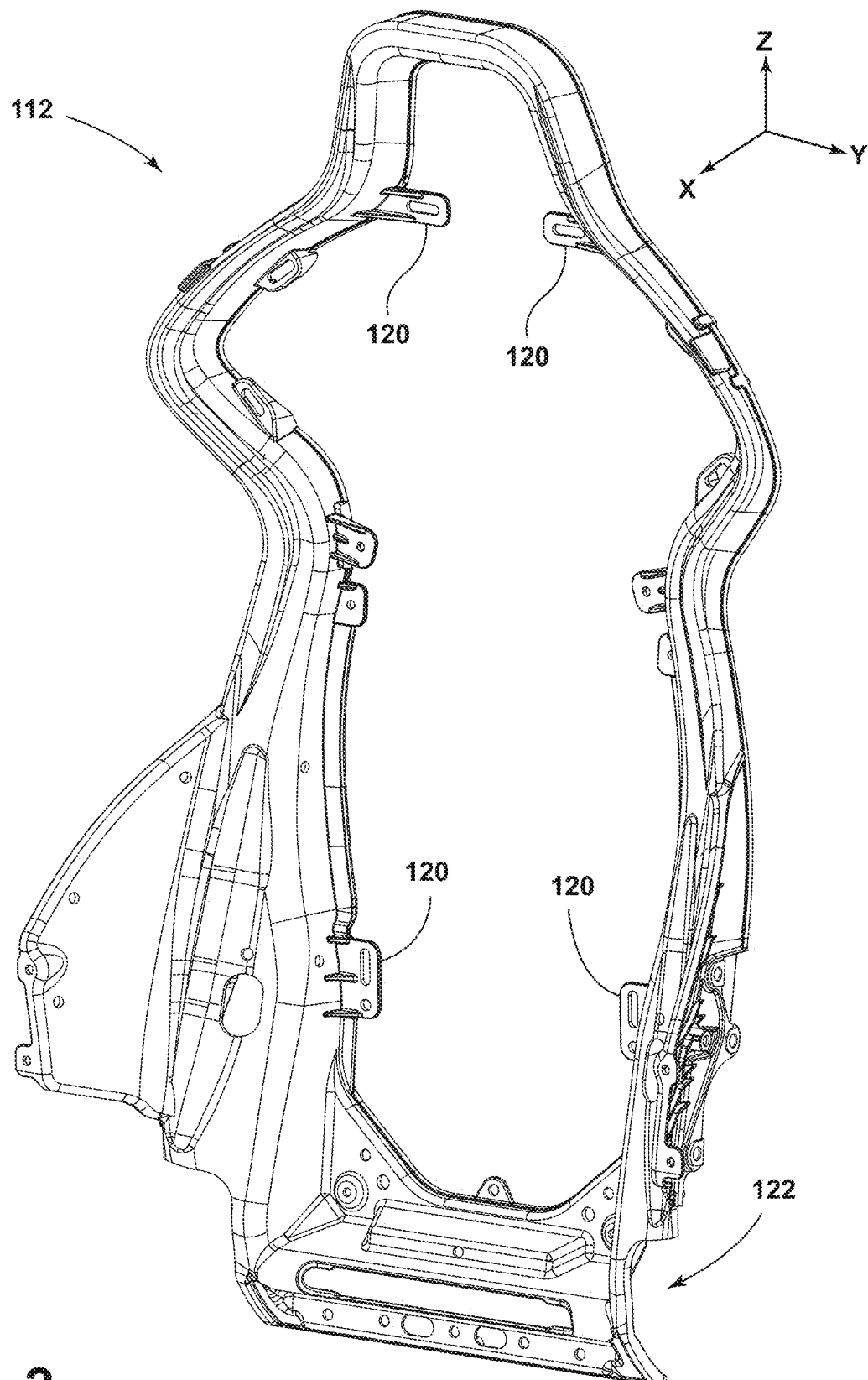
FIG. 2 is a perspective view generally illustrating an embodiment of a seatback frame according to teachings of the present disclosure.

With embodiments, the seatback 106 may be configured as a modular seatback that may include a plurality of components, elements, parts, etc. which, when assembled, may form the seatback 106. These components may be constructed or composed of a variety of materials such as fabric, foam, metal, plastic, injection foam-in-place materials, and/or other materials. With reference to FIGS. 1 and 2, a seat assembly 100 may include a seatback 106 that may include one or more seatback components such as a seatback frame 112, a rear panel 114, a bolster body 116, and a trim assembly 118. The seatback frame 112, the rear panel 114, the bolster body 116, and the trim assembly 118 may be connected together, such as partially illustrated in FIGS. 8A and 8B, for example, to form the seatback 106 and/or to form a seatback subassembly to which other components may be connected to form the seatback 106. The firmness, position, and/or orientation of the seatback 106 relative to the seat bottom 104 or the vehicle floor may be adjustable via an adjustment mechanism 106A (e.g., a recliner, a lumbar adjuster, a motor, etc.), which may allow a user to customize the configuration of the seatback 106. The seatback 106 may be any desired size and shape, and may be constructed from or composed of any desired material.

With examples, such as generally illustrated in FIG. 2, the seatback frame 112 may provide a support structure upon and/or around which other seat components or portions may be assembled. The seatback frame 112 may be composed of any material or combination of materials (e.g., metal and/or plastic) and may include a plurality of connectors 120 (e.g., flanges, recesses, bosses, etc.) to facilitate connection of other seat components or portions (e.g., the rear panel 114, the bolster body 116, the trim assembly 118, etc.) to the seatback frame 112. A lower end 122 of the seatback frame 112 may be connected to, for example, the seat bottom 104, a seat assembly adjustment track 124, a seat assembly carrier, and/or to the vehicle.

Figure 3:
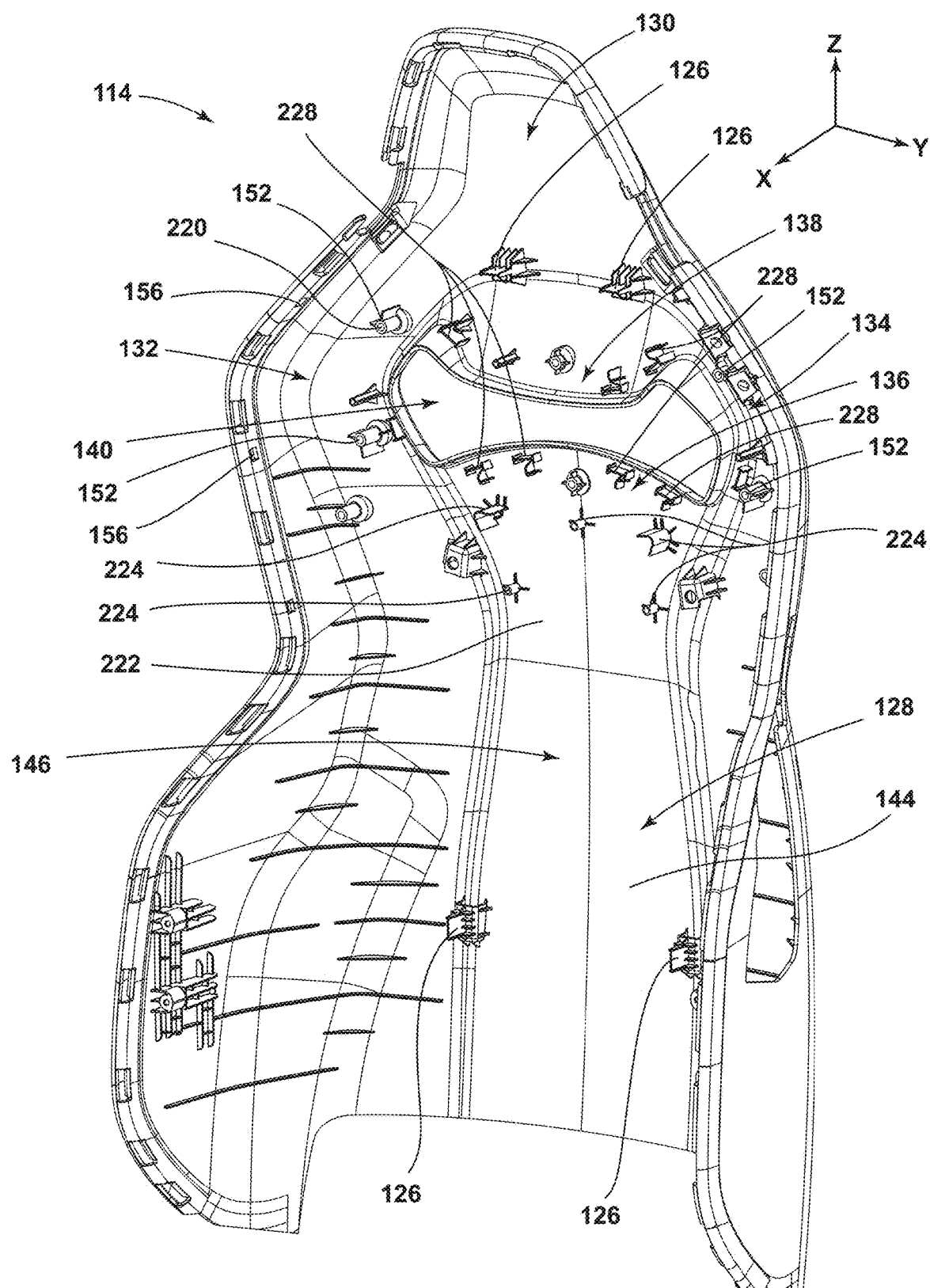
FIG. 3 is a perspective view generally illustrating an embodiment of a rear panel of a seatback according to teachings of the present disclosure.

With embodiments, such as depicted in FIG. 3, the rear panel 114 may be configured as a portion of a cover, housing, or structure to form the backside of the seatback 106. The rear panel 114 may be any desired size and shape, and may be constructed from or composed of any desired material (e.g., a plastic or a plastic composition). The rear panel 114 may be connectable to a variety of other seat components 102 or parts such as the seatback frame 112, the bolster body 116, and/or the trim assembly 118. To facilitate such connections, the rear panel 114 may include a plurality of connectors 126 (e.g., flanges, recesses, bosses, and/or other connecting structures).

In examples, the rear panel 114 may include and/or be defined by a plurality of sections and/or portions. In some examples, the rear panel 114 may include a first section 128. The first section 128 may be disposed at or about a region where the back of user would be located when sitting in the seat assembly 100. The first section 128 may be configured as a backrest section and/or may be configured to connect to other seat components 102.

With examples, the rear panel 114 may include a second section 130. The second section 130 may be disposed at, about, and/or above the first section 128 in the Z-direction. The second section 130 may be configured as a headrest section (e.g., a part of headrest 108) and may be configured, for example, to connect to various seat components 102, such as a headrest assembly which may include a headrest pad and a headrest cover.

In embodiments, the rear panel 114 may include a third section 132 and a fourth section 134. The third section 132 and the fourth section 134 may be connected to the first section 128 and/or the second section 130. In embodiments, the third section 132 and the fourth section 134 may be connected to an upper region 136 of the first section 128 relative to the Z-direction at a respective first end. The third section 132 and the fourth section 134 may be connected to a lower region 138 of the second section 130 relative to the Z-direction at a respective second end. The third section 132 and the fourth section 134 may be connected to opposite lateral sides (e.g., opposite sides relative to the Y-direction) of the first section 128 and/or the second section 130. With embodiments, like those depicted in FIGS. 1 and 3, the second section 130 may be disposed above the first section 128 in the Z-direction, and the third section 132 and the fourth section 134 may extend between and connect the first section 128 and the second section 130 such that a seatback opening 140 is defined by the first section 128, the second section 130, the third section 132, and/or the fourth section 134.

Figure 7:
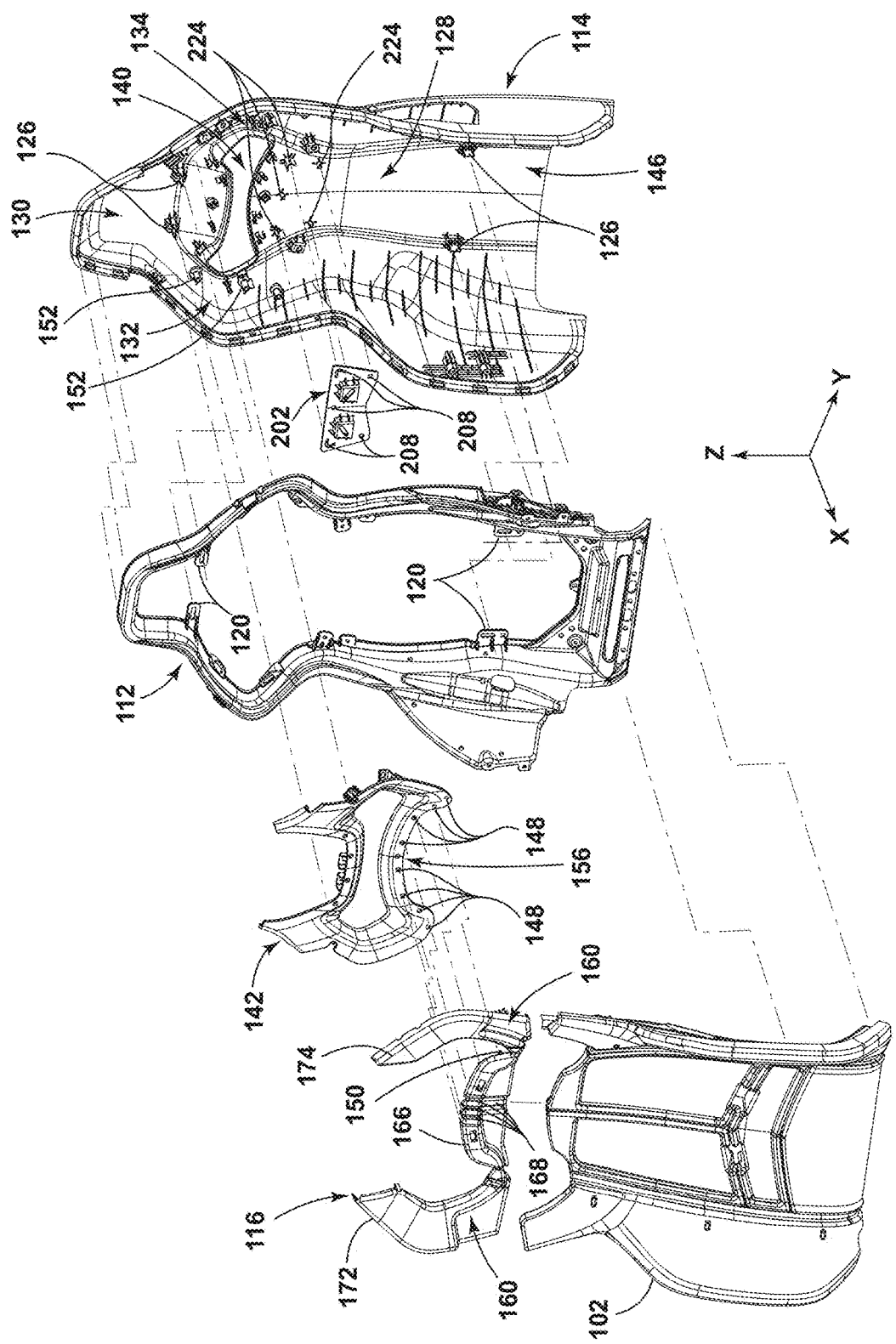
FIG. 7 is an exploded perspective view generally illustrating embodiments of a seatback frame, a rear panel, a bolster body, and a clip mount according to teachings of the present disclosure.
Figure 8A:
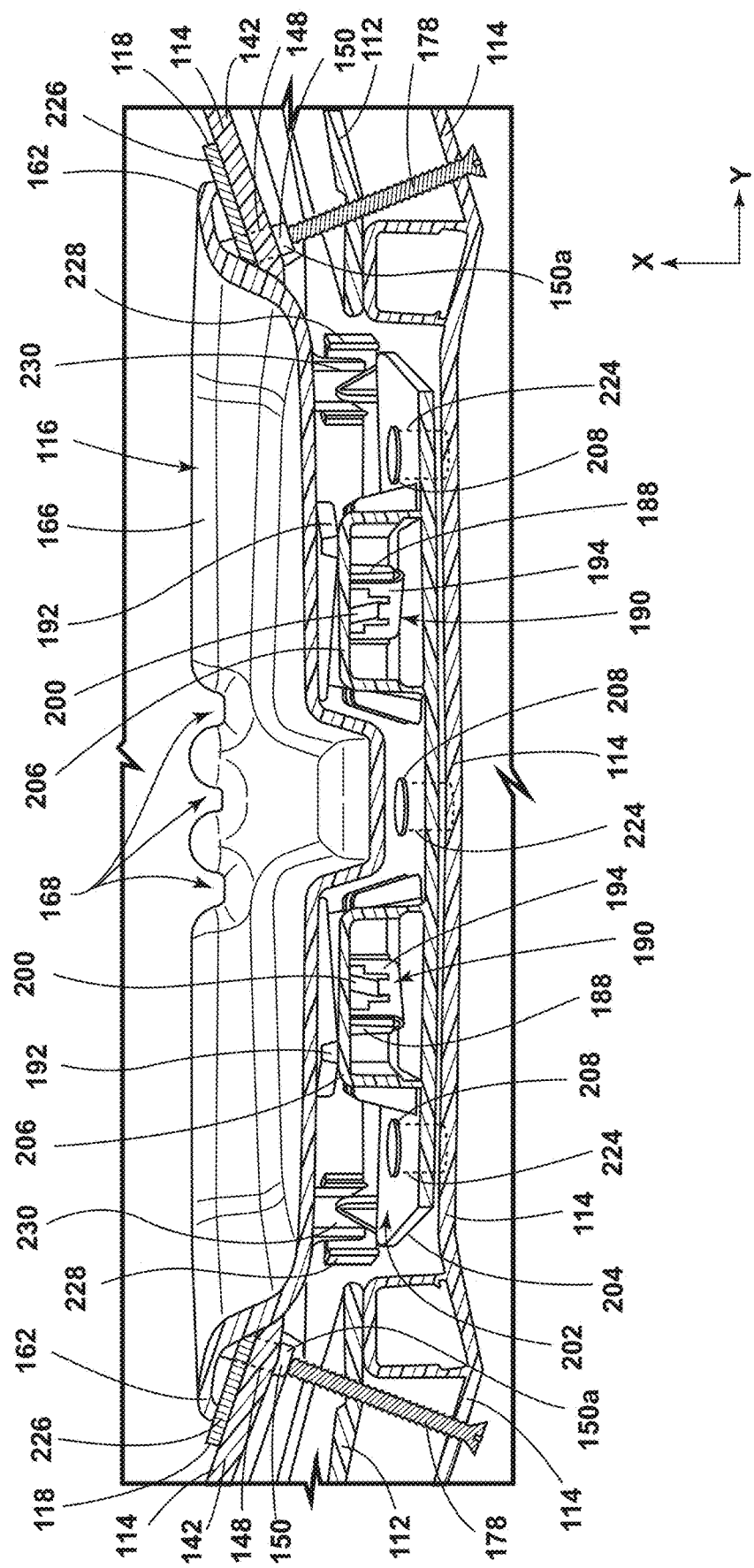
FIGS. 8A and 8B are cross-sectional views of embodiments of a seatback frame, a rear panel, a bolster body, and a trim assembly connected to one another according to teaching of the of the present disclosure.

With embodiments, such as generally illustrated in FIG. 7, the rear panel 114 may include a fifth section 142. In embodiments, the fifth section 142 may be configured as a separate component connectable to at least one other sections or portions of the rear panel 114. The fifth section 142 may, for example, be configured as a cover section connectable to a front side 144 of the rear panel 114, and may define at least a portion of a seatback interior space 146 therebetween. In some embodiments, the fifth section 142 may include one or more connectors 230 that may engage with a respective connector 228 of the first section 128, the second section 130, the third section 132, and/or the fourth section 134, as generally depicted in FIG. 8A, such as to connect the fifth section 142 to the rear panel 114 and/or one or more of the sections 128, 130, 132, 134 thereof. As generally shown in FIGS. 1 and 7, the fifth section 142 may have a generally rounded shape (e.g., with opposing convex portions and opposing concave portions) that may be complimentary to the seatback opening 140. Additionally or alternatively, the fifth section 142 may be configured in a complimentary manner to the first section 128, the second section 130, the third section 132, and/or the fourth section 134. The fifth section 142 may be connected to the front side 144 of the rear panel 114 to at least partially surround the seatback opening 140 and/or to at least partially cover the first section 128 (e.g., the upper region 136 of the first section 128), the second section 130 (e.g., a lower region 138 of the second section 130 relative to the Z-direction), the third section 132, and/or the fourth section 134. The fifth section 142 may be configured to connect to various other seat components 102 and/or to facilitate connection of other seat components 102 to the seat assembly 100.

In embodiments, such as those generally shown in FIGS. 7, 8A, 8B, 9A, and 9C, the rear panel 114 may include one or more boss recesses 148 that may be provided at the fifth section 142. At least some of the boss recesses 148 may be configured to receive and/or engage one or more bosses 150 of the bolster body 116. The boss recesses 148 may be disposed on one or more of the sections of the rear panel 114 (e.g., the first section 128, the second section 130, the third section 132, etc.) and/or may be aligned in the X-direction with an associated boss 150 of the bolster body 116 and/or an associated connector 120 of the seatback frame 112. With embodiments, at least one of the boss recesses 148 may be structured as a through hole extending in the X-direction and may allow at least a portion of a respective boss 150 to pass completely through the boss recess 148.

Figure 8B:
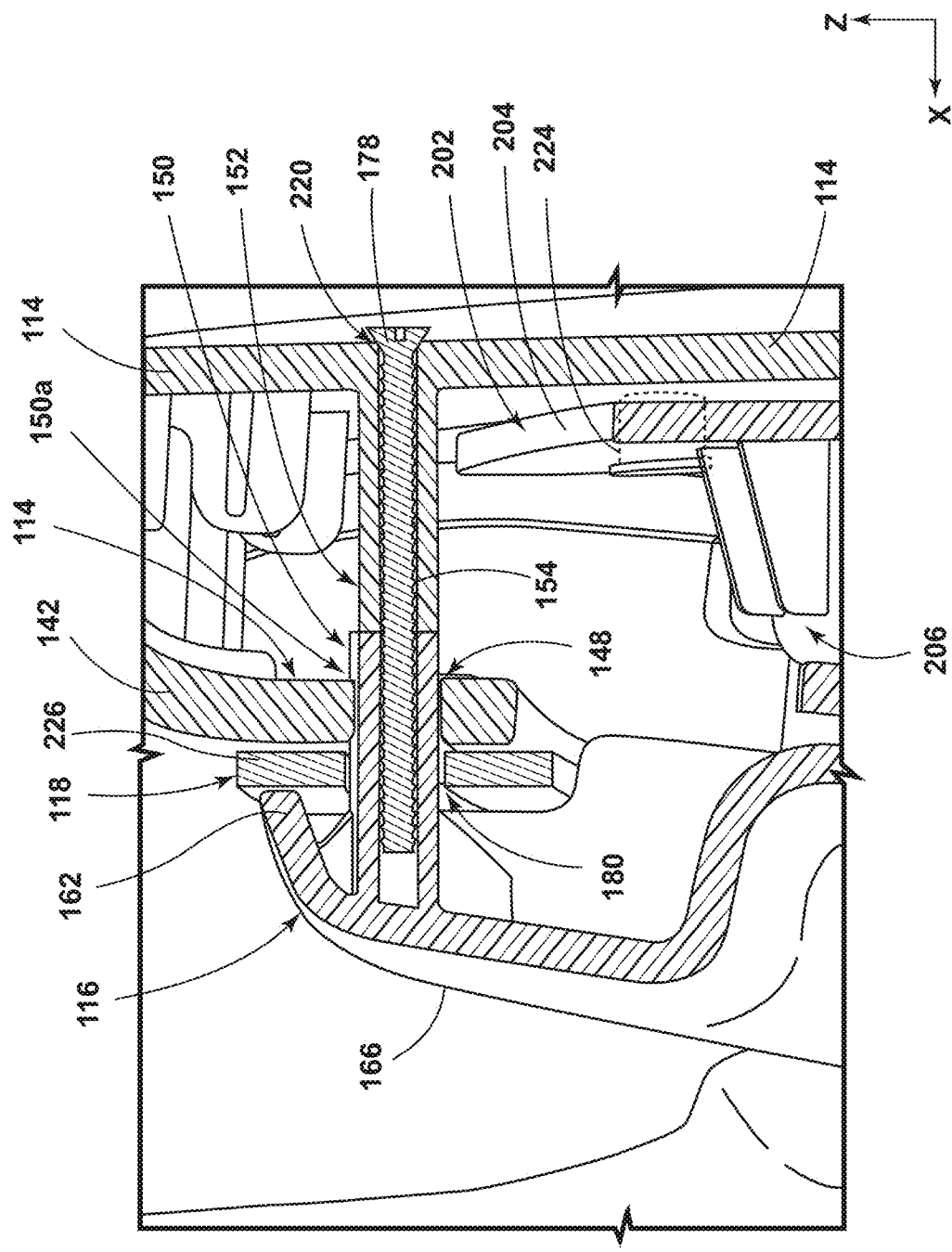

In embodiments, as generally depicted in FIGS. 7, 8A, and 8B, at least some of the boss recesses 148 may be disposed on the fifth section 142 of the rear panel 114 and may be configured to facilitate the through passage of at least a portion of an associated boss 150 into the seatback interior space 146. The rear panel 114 may include one or more fastener recesses 220 through which a fastener 178, such as a screw or bolt, may extend to engage the bolster body 116. At least some of the fastener recesses 220 may include an annular collar 152 surrounding and/or defining the fastener recess 220 and projecting from the rear panel 114, such as generally in the X-direction (see, e.g., FIG. 8B). In embodiments, the annular collars 152 may be aligned with and disposed near and/or adjacent to a respective boss 150 of the bolster body 116, generally in the X-direction, to define a fastener passage 154. In some examples, the annular collars 152 may be aligned with and contact and/or abut against the bosses 150 to define the fastener passages 154.

Figure 9A:
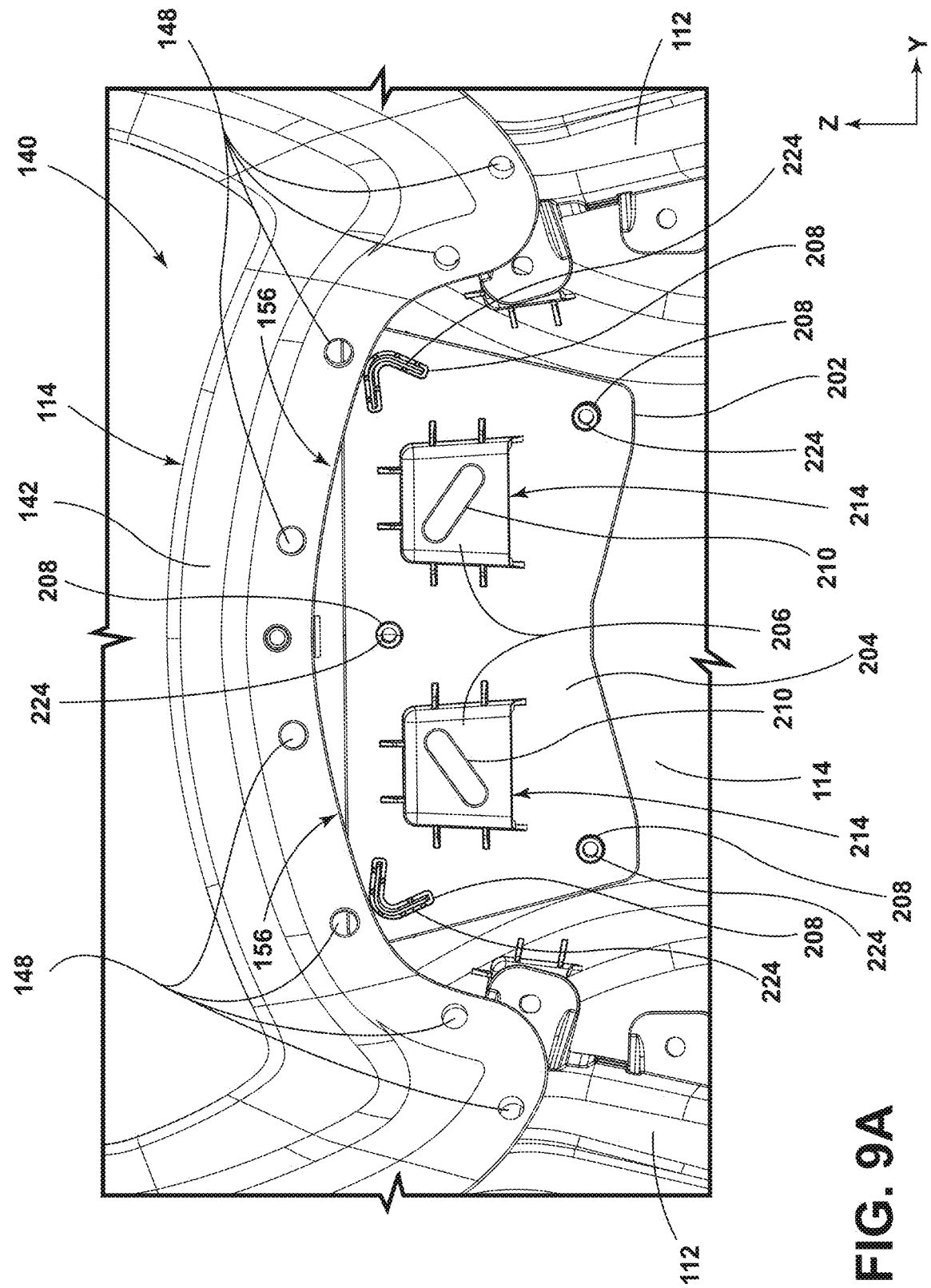
FIGS. 9A, 9B, 9C, and 9D depict the steps of an embodiment of a method of assembling a seatback frame, a rear panel, a bolster body, and a trim flap according to teachings of the present disclosure.

In embodiments, the rear panel 114 may include one or more latching structures 156 (see, e.g., FIG. 3). At least some of the latching structures 156 may be configured to releasably engage one or more hook connectors 158 of the bolster body 116 (see, e.g., FIGS. 4B and 4C). For example, at least some of the latching structures 156 may be structured as a lip, a flange, a protrusion, a bar, a recess, and/or a complimentary mating component (e.g., a hook) which engages a respective hook connector 158 of the bolster body 116. The latching structures 156 may be disposed on one or more the sections of the rear panel 114 (e.g., the first section 128, the second section 130, the third section 132, etc.). With embodiments, at least some of the latching structures 156 may be disposed at or about an outer edge of the third section 132, the fourth section 134, and/or the fifth section 142. With examples, such as generally illustrated in FIGS. 7, 9A, and 9C, one or more of the latching structures 156 may be configured as an edge of the fifth section 142.

With embodiments, such as generally illustrated in FIGS. 7 and 8A, the rear panel 114 may be connected to the seatback frame 112 and/or may be configured to at least partially receive the seatback frame 112 and retain the seatback frame 112 in the seatback interior space 146. The first section 128, the second section 130, the third section 132, the fourth section 134, and/or the fifth section 142 of the rear panel 114 may be connected to the seatback frame 112. The seatback frame 112 may extend along a first lateral side of the first section 128 substantially in the Z-direction, along the third section 132 to the second section 130, through the second section 130 to the fourth section 134, extend along the fourth section 134 back to first section 128, and along a second lateral side of the first section 128 substantially in the Z-direction. The fifth section 142 may be connected to the rear panel 114 to at least partially enclose the seatback frame 112 in the seatback interior space 146. In this manner, the seatback frame 112 may fully support all sections of the rear panel 114.

Figure 4A:
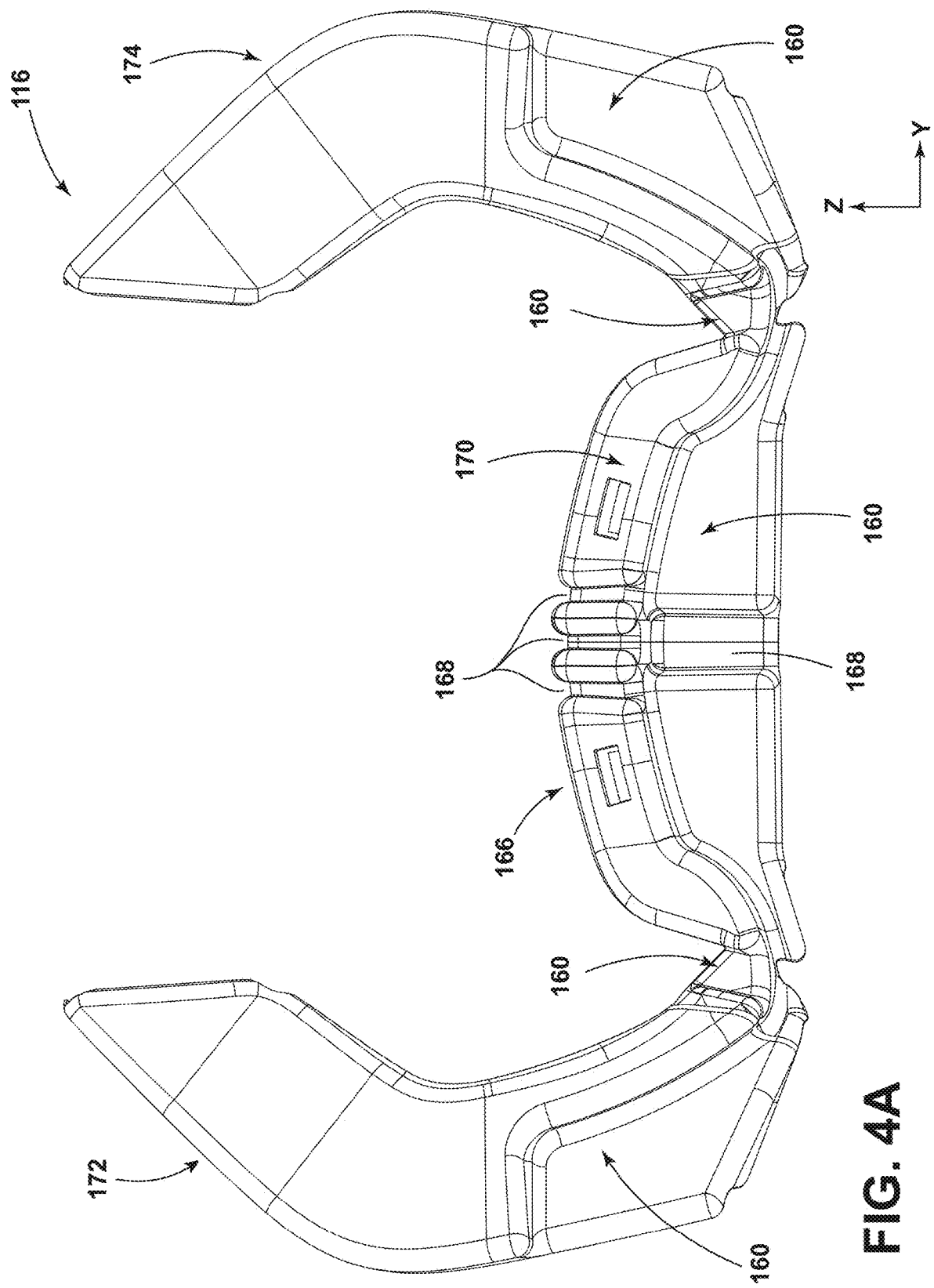
Figure 4B:
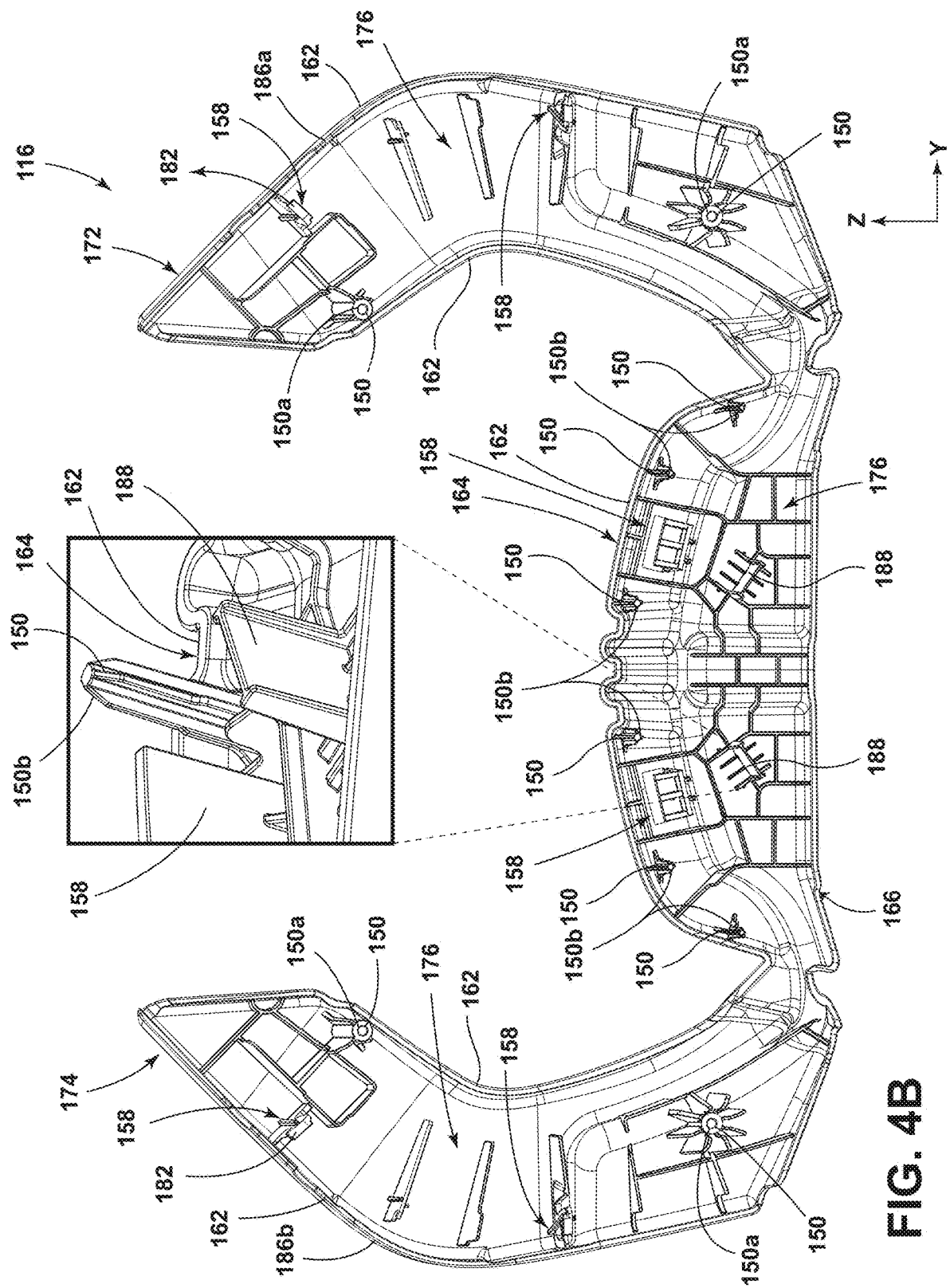

With embodiments, such as depicted in FIGS. 4A, 4B, and 4C, the bolster body 116 may be configured as a front cover portion or structure to form at least a portion of a front side support of the seatback 106. The bolster body 116 may be connectable to a variety of other seat components 102 or parts, such as the seatback frame 112, the rear panel 114, and/or the trim assembly 118. The bolster body 116 may include one or more depressions 160 configured to receive and retain another seat component 102 to, for example, facilitate proper alignment of the seat components 102 during assembly. The bolster body 116 may include one or more outer lips 162 protruding in the X-direction toward the rear panel 114 and at least partially extending around an outer edge of the bolster body 116 (see, e.g., FIG. 4B). The bolster body 116 may be any desired size and shape, and may be constructed from or composed of any desired material (e.g., a plastic or a plastic composition).

In embodiments, the bolster body 116 may include and/or be defined by a plurality of portions and/or sections. In some examples, the bolster body 116 may include a first portion 166 (e.g., a tombstone portion). The first portion 166 may be shaped in a complimentary manner to at least one of the sections of the rear panel 114, such as the first section 128, the second section 130, the third section 132, the fourth section 134, and/or the fifth section 142. As generally illustrated in FIGS. 4A and 4B, the first portion 166 may be an elongated body extending in the Y-direction and may connect other portions of the bolster body 116 to one another. One or more vertically extending grooves 168 may be disposed in an outer surface 170 of the first portion 166, which generally faces away from the rear panel 114 when the seat assembly 100 is assembled, such as at or about an upper end of the first portion 166 relative to the Z-direction. The grooves 168 may be configured to receive at least a portion of the trim assembly 118 and/or one or more other seat components 102 to help maintain the trim assembly 118 and/or the seat components 102 in a desired position when installed on the seat assembly 100.

In embodiments, the bolster body 116 may include a second portion 172 and/or a third portion 174. The second portion 172 and the third portion 174 may be connected to and/or extend from the first portion 166. In examples, the second portion 172 and the third portion 174 may be connected to opposite lateral sides (e.g., opposite sides relative to the Y-direction) of the first portion 166. The second portion 172 and/or the third portion 174 may extend transversely to the first portion 166 (e.g., may extend in a non-parallel direction) such that the bolster body 116 may be generally U-shaped. With embodiments, the second portion 172 and/or the third portion 174 may extend from the first portion 166 substantially in the Z-direction and may be curved, for example, into a C-shaped configuration. The second portion 172 and/or the third portion 174 may be shaped in a complimentary manner to at least one of the sections 128, 130, 132, 134, 142 of the rear panel 114. As generally illustrated in the example of FIG. 7, the second portion 172 of the bolster body 116 may be configured in a complimentary manner to the third section 132 and/or a region of the fifth section 142 of the rear panel 114, and/or the third portion 174 of the bolster body 116 may be configured in a complimentary manner to the fourth section 134 and/or a region of the fifth section 142 of the rear panel 114.

With embodiment, as generally illustrated in FIGS. 4A, 4B, and 4C, the bolster body 116 may be monolithic (e.g., a single, unitary component or part). In other words, all portions of the bolster body 116, including the first portion 166, the second portion 172, and the third portion 174, may be integrally provided or formed as a solid piece. In embodiments, the bolster body 116 may comprise plastic. At least one of the portions 166, 172, 174 may comprise a material more rigid than foam (which may be used in other designs), such as a plastic or metal, which may restrict and/or substantially prevent displacement of the portion 166, 172, 174 of the bolster body 116.

In embodiments, the bolster body 116 may include a plurality of connectors to facilitate connection of the bolster body 116 to various other seat components 102, such as the rear panel 114 and/or the seatback frame 112. One or more of the connectors may be configured as bosses 150 and may project from an inner surface 176 of the bolster body 116, which may generally face the rear panel 114 when the seat assembly 100 is assembled. As generally illustrated in FIGS. 8A and 8B, at least some of the bosses 150 may be configured as screw bosses 150a to receive and retain a fastener 178, such as a screw, a bolt, adhesive, and/or other connecting mechanism, to connect the bolster body 116 to the seatback frame 112 and/or the rear panel 114. At least some of the bosses 150 (e.g., the screw bosses 150a) may be aligned with and disposed near, adjacent to, in contact with, and/or in abutment with a respective fastener recess 220 and/or a respective annular collar 152. At least some of the bosses 150 may be configured as locator bosses 150b that may be configured to facilitate alignment during assembly and may or may not be configured to receive and retain a fastener 178, and may not be associated with and/or aligned with a respective fastener recess 220 and/or a respective annular collar 152 (see, e.g., FIG. 4B). The bosses 150 (e.g., the screw bosses 150a and/or the locator bosses 150b) may, in examples, be configured to engage, be received in, and/or extend through the boss recesses 148 of the rear panel 114, a connector 120 of the seatback frame 112, a boss opening 180 of the trim assembly 118, and/or a connecting structure of various other seat components 102, such as generally illustrated in FIG. 8B. Additionally or alternatively, one or more of the bosses 150 may extend and/or project farther from the bolster body 116 than the outer lip 162 of the bolster body 116, thereby allowing for a gap to be defined between the rear panel 114 and the outer lip 162 when the bosses 150 are engaged in the boss recesses 148. The bosses 150 may be disposed on one or more portions of the bolster body 116, such as the first portion 166, the second portion 172, and/or the third portion 174. In examples, such as generally depicted in FIG. 4B, several locator bosses 150b may be disposed spaced apart from one another along an outer edge 164 of the first portion 166 in the Z-direction, while several screw bosses 150a may be disposed spaced apart from one another on the second portion 172 and/or the third portion 174. In other examples, such as the one depicted in FIG. 8A, several screw bosses 150a may be disposed spaced apart from one another along the outer edge 164 of the first portion 166 in the Z-direction, and several screw bosses 150a may be disposed spaced apart from one another on the second portion 172 and/or the third portion 174.

With examples, one or more of the connectors may be configured as hook connectors 158 and may project from the inner surface 176 of the bolster body 116. The hook connectors 158 may be configured to releasably engage one or more of the latching structures 156 of the rear panel 114 and may include a hook/latch 182 for this purpose (see, e.g., FIG. 4C). At least some of the hook connectors 158 may, in examples, be configured to engage, be received in, and/or extend through hook openings 184 of the trim assembly 118 and/or a connecting structure of other seat components 102. With embodiments, at least some of the hook connectors 158 may be disposed at or about an outer edge 186a, 186b of the second portion 172 and/or the third portion 174 that may be disposed opposite the first portion 166. With some examples, at least some of the hook connectors 158 may be disposed at or about the outer edge 164 of the first portion 166. The respective latch 182 of the hook connectors 158 may project from the hook connectors 158 away from the seatback opening 140 and/or toward the seatback opening 140.

With examples, one or more of the connectors may be configured as a flange 188, projection, and/or other body protruding from the inner surface 176 of the bolster body 116 (see, e.g., FIG. 4B). The flanges 188 may be configured to engage and retain one or more clips 190, such as A-clips, for example (see, e.g., FIGS. 5A and 5B). With embodiments, at least some of the flanges 188 may be disposed on one or more of the portions 166, 172, 174 of the bolster body 116. For example, two flanges 188 may be disposed on the first portion 166 of the bolster body 116.

Figure 5B:
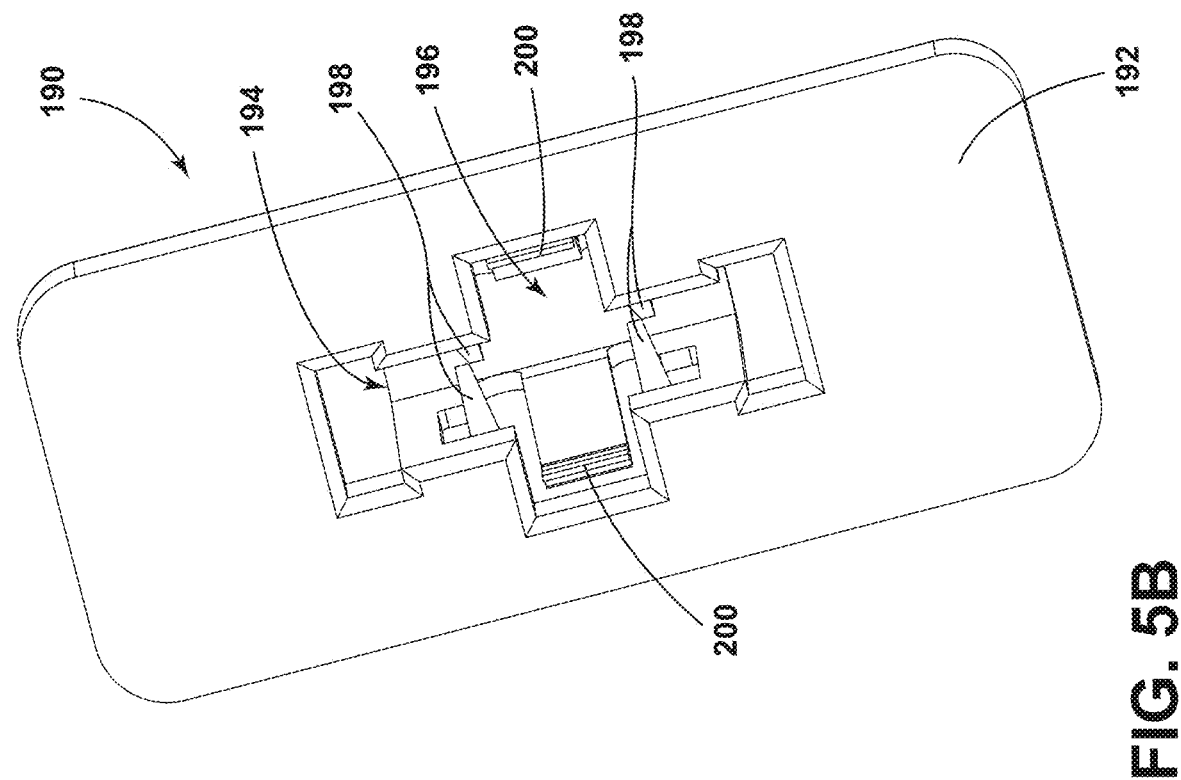
FIGS. 5A and 5B are perspective views generally illustrating an embodiment of a clip according to teachings of the present disclosure.
Figure 5A:
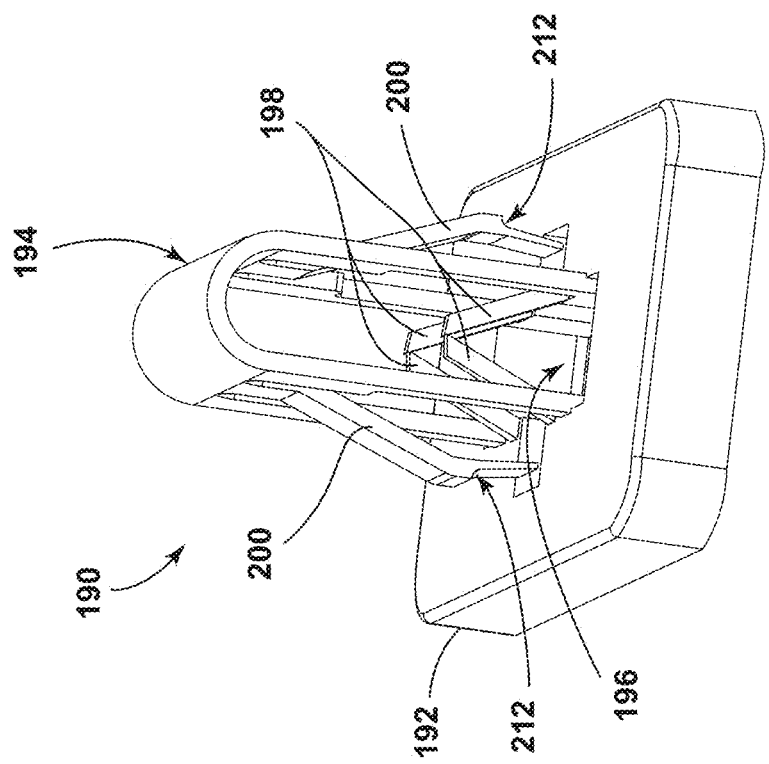

In embodiments, such as generally depicted in FIGS. 5A and 5B, one or more clips 190 may have a base portion 192 and/or a receiving portion 194. A respective flange 188 of the bolster body 116 may be inserted into an opening 196 in the base portion 192 of the clip 190 and protrude into the receiving portion 194. The receiving portion 194 may include one or more internal engagement protrusions 198 projecting into the receiving portion 194 and configured to engage the flange 188 when the flange 188 is inserted into the clip 190. The clip 190 may, additionally or alternatively, also include one or more external engagement protrusions or arms 200 that may protrude outward from the receiving portion 194 of the clip 190 and may be configured to releasably engage a clip mount 202.

Figure 6:
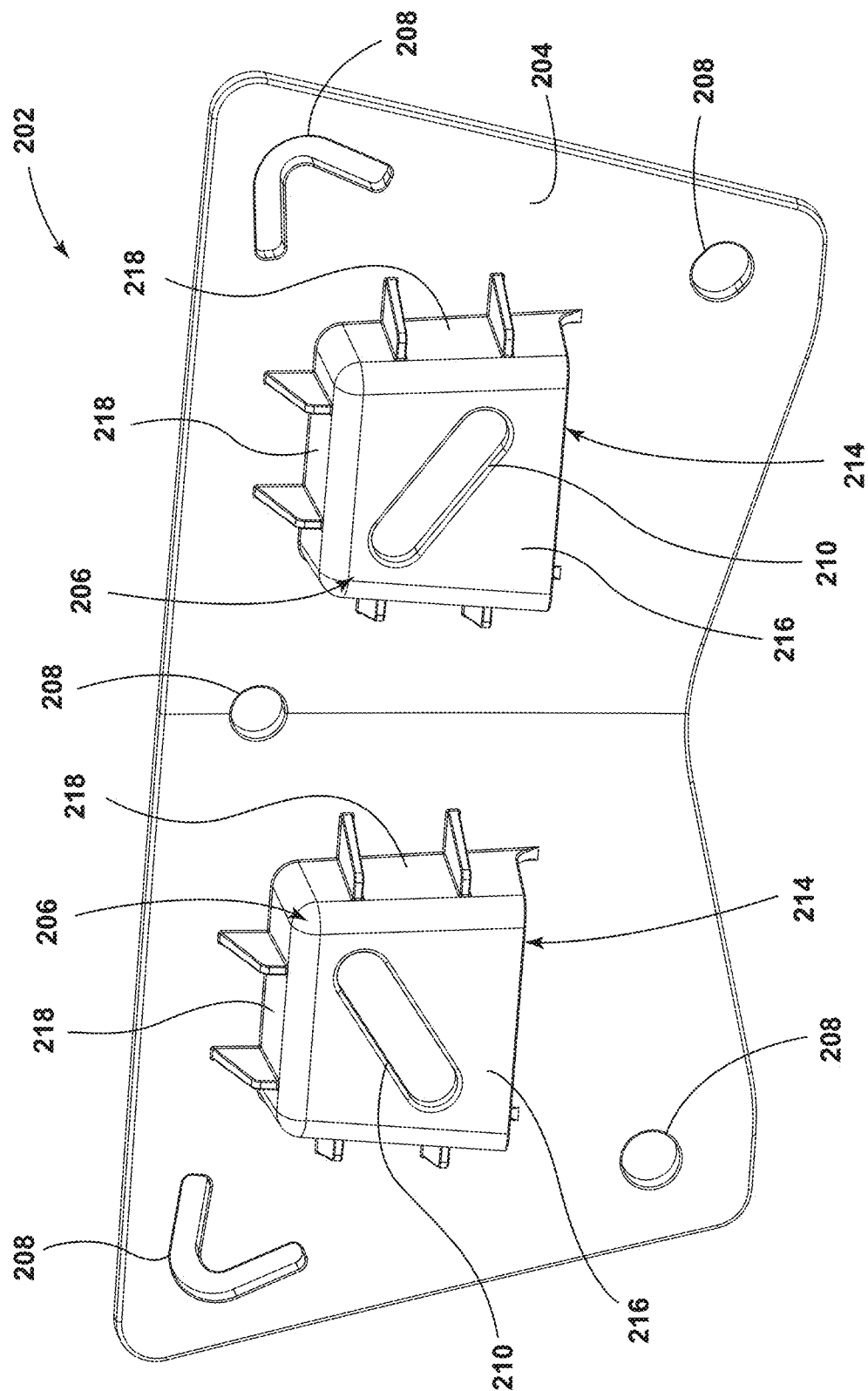
FIG. 6 is a perspective view generally illustrating an embodiment of a clip mount according to teachings of the present disclosure.

With embodiments, such as generally depicted in FIG. 6, a clip mount 202 may include a base panel 204 and one or more elevated portions 206. The base panel 204 may be configured as a substantially planar body including one or more mounting recesses 208 via which the base panel 204 may be connectable to a seat component 102. The one or more elevated portions 206 may be disposed on and/or formed by a portion of the base panel 204. One or more elevated portions 206 may include a clip receptacle 210 that may be configured to engage, receive, and/or retain at least a portion of one or more of the clips 190. With embodiments, a clip receptacle 210 may be configured to at least partially receive a respective clip 190, such as at least a portion of the receiving portion 194 of the respective clip 190. When the clip 190 is inserted into the respective clip receptacle 210, the external engagement protrusions 200 may flex inwardly and return to their original position once the clip 190 is sufficiently/fully inserted into the clip receptacle 210. When sufficiently/fully inserted into the clip receptacle 210, a stepped portion 212 of the external engagement protrusions 200 may contact, engage, and/or abut against the elevated portion 206 and/or an edge of the clip receptacle 210 to releasably connect the clip 190 to the clip mount 202. With embodiments, the elevated portions 206 may include a release opening 214 through which a tool may be inserted to interact with the external engagement protrusions 200 to release the clip 190 from the clip mount 202 and facilitate its removal therefrom. In some examples, this may include inserting a tool through the release opening 214 to push the external engagement protrusion 200 and flex the external engagement protrusion 200 inward to prevent the stepped portion 212 from contacting and/or engaging the elevated portion 206. In examples, such as generally illustrated in FIG. 6, the elevated portions 206 may be generally box-shaped with one or more elevated surfaces 216 spaced apart from the base panel 204 by one or more walls 218. The clip receptacle 210 may be disposed in the elevated surface 216 of the box-shaped elevated portion 206. The release opening 214 may be disposed in one of the walls 218 of the box-shaped elevated portion 206 and/or may be formed by the absence of one of the walls 218 of the box-shaped elevated portion 206.

With embodiments, such as those generally depicted in FIGS. 7 and 9A, the clip mount 202 may be connected to the inner surface 222 of the rear panel 114 in the upper region 136 of the first section 128 of the rear panel 114 adjacent to the seatback opening 140. To connect the clip mount 202 to the rear panel 114, the rear panel 114 may include mounting projections 224 protruding from the inner surface 222 and may be configured to be received in the mounting recesses 208 of the clip mount 202. Once arranged within the mounting recesses 208, the mounting projections 224 of the rear panel 114 can be deformed to connect the base panel 204 to the rear panel 114. In examples, the mounting projections 224 may be heated and/or melted within the mounting recesses 208 to connect the clip mount 202 to the rear panel 114 via heat staking. The mounting projections 224, after deformation, may extend over top of the base panel 204, such as generally illustrated in FIGS. 8A, 8B, 9C, and 9D. Additionally and/or alternatively, a fastener 178, such as screws, bolts, and/or other mechanisms, may extend through the rear panel 114 and/or mounting openings in the rear panel 114 to engage the mounting recesses 208 in the base panel 204 of the clip mount 202.

In embodiments, the trim assembly 118 may be configured to provide at least a portion of an outer, padded portion of the seatback 106 against which a user may sit. The trim assembly 118 may include one or more portions such as pads, cushions, and/or fabric covers. The trim assembly 118 may also include one or more trim flanges 226 via which the trim assembly 118 may be connectable to the seatback frame 112, the rear panel 114, the bolster body 116, the seatback 106, and/or the seat assembly 100 (see, e.g., FIG. 9B). The trim flanges 226 may project from the trim assembly 118 and may be at least partially inserted and/or disposed between the bolster body 116 and the rear panel 114. The trim flanges 226 may include one or more boss openings 180 that may be structured as a through hole extending in the X-direction allowing at least a portion of an associated boss 150 of the bolster body 116 to pass into and/or completely through the trim flange 226. The trim flanges 226 may include one or more hook openings 184 that may be structured as a through hole extending in the X-direction, such as to allow at least a portion of an associated hook connector 158 of the bolster body 116 to pass into and/or completely through the trim flange 226. When engaged on the bosses 150 and/or the hook connectors 158 of the bolster body 116, as generally illustrated in FIGS. 8A, 8B, 9B, 9C, and 9D for example, interaction between the boss openings 180 and the bosses 150 and/or the hook openings 184 and the hook connectors 158 may at least partially facilitate connection of the trim assembly 118 to the bolster body 116. When the bolster body 116 and rear panel 114 are connected together, the trim flanges 226 may be sandwiched, pressed, squeezed, and/or compressed between the rear panel 114 and the bolster body 116 (e.g., the outer lip 162) to further connect and secure the trim assembly 118 thereto.

FIGS. 7, 9A, 9B, 9C, and 9D generally illustrate an embodiment of a method of assembling a seat assembly 100 and/or a seatback subassembly of the seat assembly 100. Referring now to FIG. 9A, the rear panel 114 may be connected to the seatback frame 112. The mounting recesses 208 of the clip mount 202 may be aligned with the mounting projections 224 of the rear panel 114. The clip mount 202 may be adjusted such that the mounting projections 224 are received within and/or engage with the mounting recesses 208 disposed in the base panel 204 of the clip mount 202. The mounting projections 224 may be deformed, such as by heating, to connect and/or secure the clip mount 202 to the rear panel 114 (e.g., via heat staking). Additionally and/or alternatively, connecting the clip mount 202 to the rear panel 114 may include inserting fasteners 178, such as screws and/or bolts, through mounting openings in the rear panel 114 and the mounting recesses 208 of the clip mount 202 to engage both the rear panel 114 and the bolster body 116.

Figure 9B:
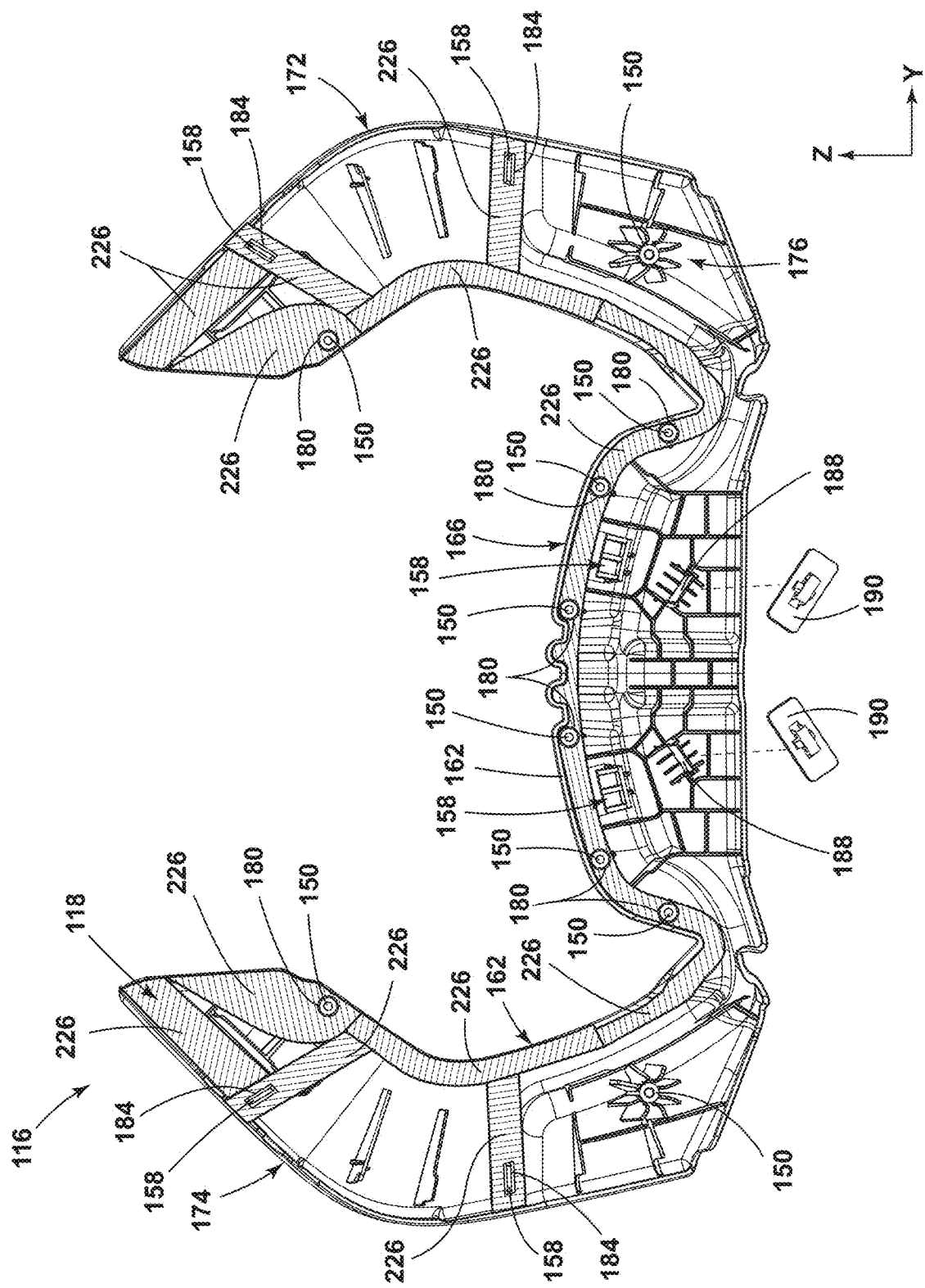
Figure 9C:
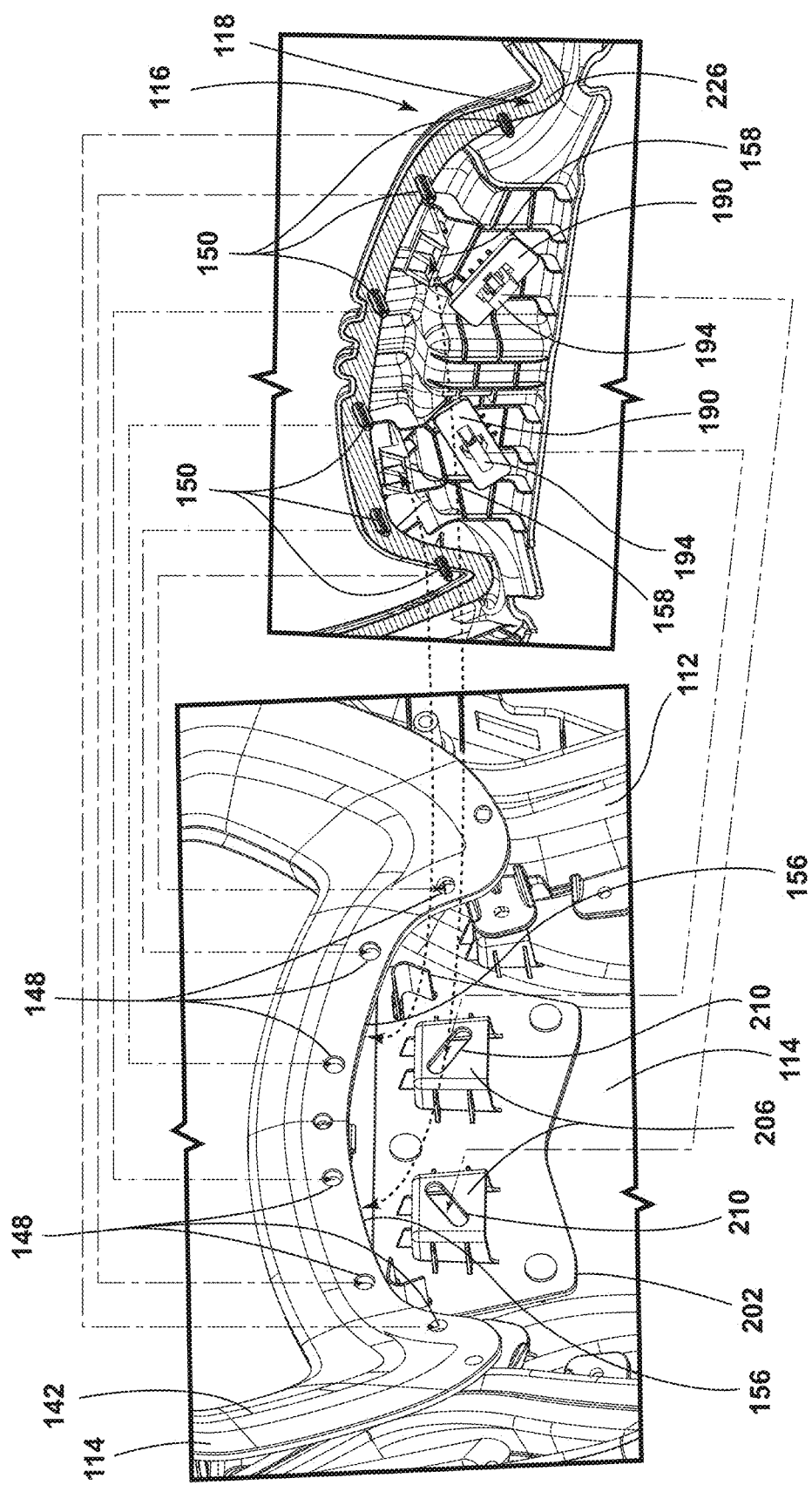

As generally depicted in FIG. 9B, the clips 190 may be adjusted and/or positioned to engage the flanges 188 of the bolster body 116, which may include inserting the flanges 188 into the opening 196 of a respective clip 190. Additionally and/or alternatively, the clips 190 could be inserted and engaged with the clip receptacles 210 of the clip mount 202 prior to inserting and engaging the flanges 188 of the bolster body 116 with the clips 190. The trim assembly 118 may be releasably connected to the bolster body 116, which may include wrapping one or more portions of the trim assembly 118 (e.g., trim flanges 226) around one or more edges of the bolster body 116, inserting at least some of the hook connectors 158 of the bolster body 116 into the hook openings 184 of the trim flange 188, and/or inserting the bosses 150 of the bolster body 116 into the boss openings 180 of the trim flange 226.

In examples, after the trim assembly 118 has been connected (e.g., releasably) to the bolster body 116, the bolster body 116 may be aligned with and connected (e.g., releasably) to the rear panel 114 such that the trim flange 226 is disposed between the bolster body 116 and the rear panel 114 (e.g., the fifth section 142 of the rear panel 114), such as illustrated in FIG. 9C. Releasably connecting the bolster body 116 and the rear panel 114 may include aligning at least a subset of the bosses 150 (e.g., the screw bosses 150a) of the bolster body 116 with a respective annular collar 152 of the rear panel 114 and adjusting the subset of bosses 150 and the annular collars 152 to be disposed adjacent to one another, and/or to be in contact with one another to form and/or partially form fastener passages 154. Releasably connecting the bolster body 116 to the rear panel 114 may include inserting and engaging the bosses 150 of the bolster body 116 with a respective boss recess 148 of the rear panel 114, abutting one or more of the bosses 150 (e.g., one or more screw bosses 150a) of the bolster body 116 against a respective annular collar 152 of the rear panel 114, engaging the hook connectors 158 of the bolster body 116 with one or more of the latching structures 156 of the rear panel 114, and/or inserting and engaging the clip 190 connected to the flange 188 of the bolster body 116 into a respective clip receptacle 210 of the clip mount 202. Releasably connecting the bolster body 116 to the rear panel 114 in this manner may allow for these components to be easily connected together (e.g., without tools), to be properly aligned prior to being fixed in position, and/or for the bolster body 116 and/or the rear panel 114 to be slightly adjusted to facilitate installation of additional seating components 102. Furthermore, a releasable connection may allow for the bolster body 116 and the rear panel 114 to be connected without push pins (e.g., Christmas tree-shaped push pins) and, thus, may avoid complications and pitfalls associated therewith. For example, as the clips 190 are connected to the bolster body 116 and/or the clip mount 202, the clips 190 are easy to locate and control during assembly and may, therefore, make assembly more efficient.

Figure 9D:
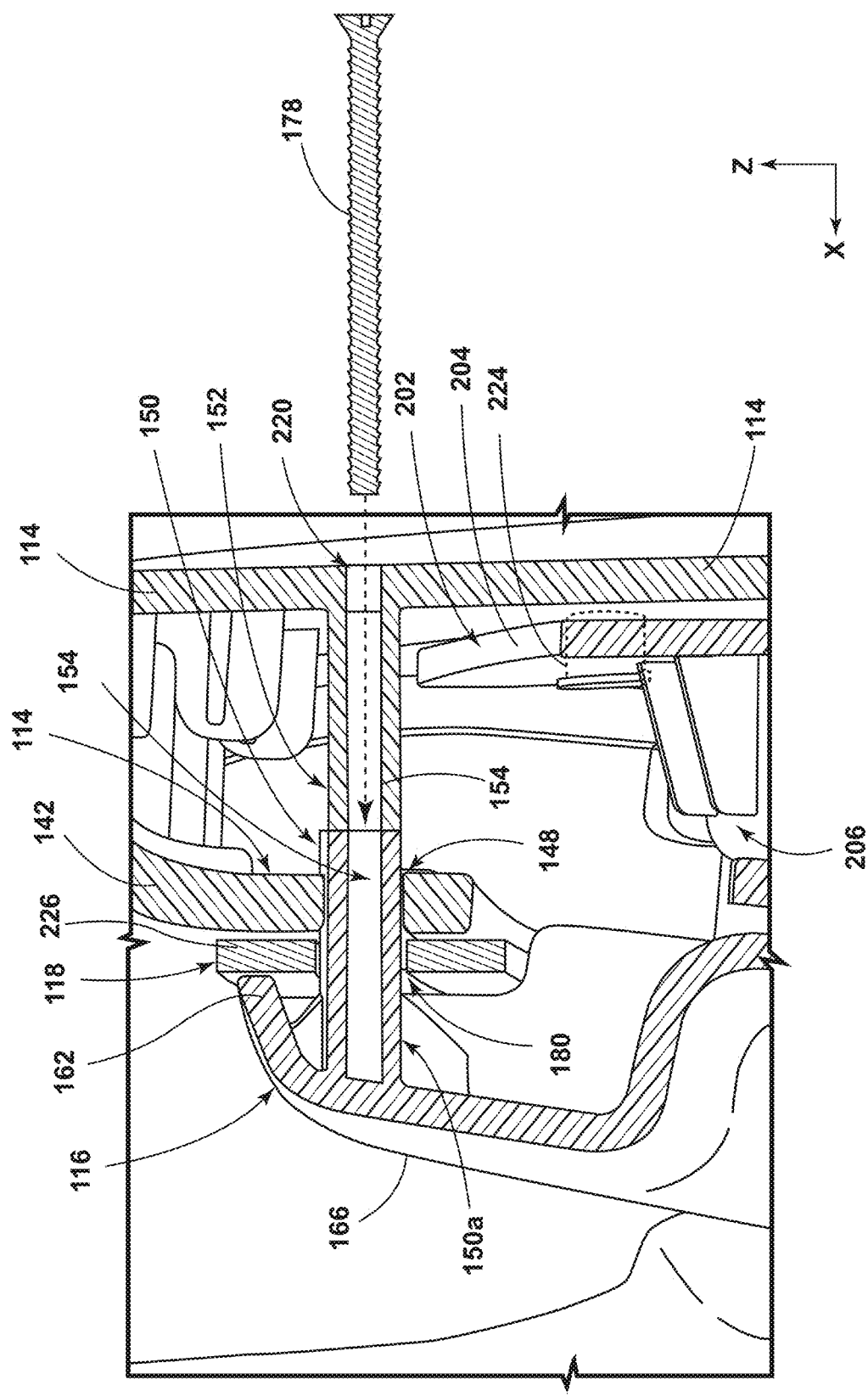

As generally depicted in FIG. 9D, after the bolster body 116 has been releasably connected to the rear panel 114, fasteners 178, such as screws and/or bolts, may be inserted through the fastener recesses 220 and driven into the annular collars 152 and/or at least some of the bosses 150 (e.g., the screw bosses 150a) to secure, couple, and/or fix the bolster body 116, the rear panel 114, trim assembly 118, and/or the seatback frame 112 together to form a seatback subassembly and/or the seatback 106. Additionally or alternatively, driving fasteners 178 into the annular collars 152 and/or the bosses 150 may draw and/or pull the bolster body 116 toward and/or against the rear panel 114 such that the trim flanges 226 are sandwiched and/or pressed between the outer lip 162 of the bolster body 116 and the rear panel 114, which may further connect the trim assembly 118 thereto and/or further secure the trim assembly 118 in position. An exemplary seatback/seatback subassembly 106 is illustrated in FIGS. 8A and 8B.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A seat assembly, comprising:
   a seatback frame;
   a rear panel connected to the seatback frame; and
   a bolster body releasably connected to the rear panel, the bolster body including a first portion, a second portion, and a third portion;
   wherein (i) the second portion extends from a first side of the first portion and (ii) the third portion extends from a second side of the first portion such that the bolster body is substantially U-shaped;
   the rear panel includes a plurality of boss recesses;
   the first portion, the second portion, and the third portion each include a plurality of bosses projecting from a rear surface of the bolster body; and
   the plurality of bosses are each disposed within a respective one of the plurality of boss recesses.

2. The seat assembly according to claim 1, including a clip mount connected to the rear panel, wherein:
   the clip mount includes (i) a base panel connected to an inner surface of the rear panel and (ii) an elevated portion projecting from the base panel, the elevated portion having a clip recess configured to engage a clip; and
   the bolster body is releasably connectable to the rear panel via the clip mount.

3. The seat assembly according to claim 1, including:
   an elevated portion connected to the rear panel, the elevated portion having a clip recess; and
   a clip configured complimentary to the clip recess;
   wherein the first portion includes a flange projecting from a rear surface of the first portion, the clip connected to the flange; and
   wherein the flange and the clip are inserted into the clip recess and engage with the elevated portion to releasably connect the bolster body to the rear panel.

4. The seat assembly according to claim 3, wherein:
   the second portion and the third portion of the bolster body each include a hook connector;
   the rear panel includes a plurality of latching structures; and
   the hook connector of the second portion and the hook connector of the third portion each engage with a respective one of the plurality of latching structures to releasably connect the bolster body to the rear panel.

5. The seat assembly according to claim 1, including a trim assembly, wherein:
   the trim assembly includes a trim flange;
   the trim flange extends at least partially between the bolster body and the rear panel, and engages the bolster body to connect the trim assembly to the bolster body;
   the trim flange includes a boss opening via which the trim flange engages the bolster body; and
   at least one of the bosses is disposed within a respective one of the plurality of boss recesses and the boss opening.

6. The seat assembly according to claim 1, wherein:
   the rear panel includes a first section, a second section, a third section, and a fourth section;
   the second section is spaced apart from the first section and connected thereto via the third section and the fourth section;
   the third section and the fourth section are connected to opposite sides of the first section and are connected to opposite sides of the second section; and
   the first portion of the bolster body is connected to the rear panel at or about an upper end of the first section, the second portion of the bolster body is connected to the third section of the rear panel, and the third portion of the bolster body is connected to the fourth section of the rear panel.

7. The seat assembly according to claim 1, wherein the first portion, the second portion, and the third portion of the bolster body are integrally provided as a single piece such that the bolster body is monolithic.

8. A seat portion, comprising:
   a first portion;
   a second portion extending from a first end of the first portion; and
   a third portion extending from a second end of the first portion;
   wherein the first portion, the second portion, and the third portion collectively define a substantially U-shaped bolster body releasably connectable to a seating component;
   wherein the first portion includes a flange projecting from a rear surface of the first portion; and
   wherein the flange is configured to engage and retain a clip via which the bolster body is releasably connectable to said seating component.

9. The seat portion according to claim 8, wherein the first portion, the second portion, and the third portion of the bolster body are integrally provided as a single plastic piece such that the bolster body is monolithic.

10. The seat portion according to claim 8, wherein the second portion and the third portion each include a plurality of hook connectors configured to engage a complimentary latching structure of said seating component.

11. The seat portion according to claim 8, wherein:
    the bolster body includes at least one outer lip projecting therefrom and extending at least partially around an outer perimeter of the bolster body; and
    the at least one outer lip is configured to at least partially connect a trim assembly to said seating component.

12. A method of assembling a seat assembly including an elevated portion, a rear panel, and a bolster body, the method comprising:
    connecting the elevated portion to the rear panel, the elevated portion including a clip recess;
    releasably connecting the bolster body to the rear panel via engaging a clip connected to the bolster body in the clip recess of the elevated portion; and
    connecting the bolster body to the rear panel with a fastener;
    wherein the bolster body includes a first portion, a second portion, and a third portion;
    wherein the second portion extends from a first end of the first portion;
    wherein the third portion extends from a second end of the first portion;
    wherein the rear panel includes a first section, a second section, a third section, and a fourth section;
    wherein the third section and fourth section extend between and connect the first section and the second section to one another; and
    wherein releasably connecting the bolster body to the rear panel includes disposing the bolster body on the rear panel such that the first portion is aligned with the first section, the second portion is aligned with the third section, and the third portion is aligned with the fourth section.

13. The method according to claim 12, wherein:
releasably connecting the bolster body to the rear panel includes engaging a hook connector of the bolster body with a latching structure of the rear panel; and
the hook connector is disposed on a rear surface of the bolster body.

14. The method according to claim 12, including:
connecting a trim assembly to the bolster body; and
inserting a trim flange of the trim assembly at least partially between the bolster body and the rear panel.

15. The method according to claim 14, wherein connecting the trim assembly to the bolster body includes inserting a boss of the bolster body into a boss opening of the trim flange.

16. The method according to claim 15, wherein releasably connecting the bolster body to the rear panel includes inserting the boss of the bolster body into a boss recess of the rear panel after inserting the boss into the boss opening of the trim flange.

17. The method according to claim 16, wherein connecting the bolster body to the rear panel with the fastener includes, after releasably connecting the bolster body to the rear panel, pressing the trim flange between the bolster body and the rear panel via driving the fastener through the rear panel and into the boss.

18. A seat assembly, comprising:
a seatback frame;
a rear panel connected to the seatback frame;
a trim assembly including a trim flange; and
a bolster body releasably connected to the rear panel, the bolster body including a first portion, a second portion, and a third portion;

wherein (i) the second portion extends from a first side of the first portion and (ii) the third portion extends from a second side of the first portion such that the bolster body is substantially U-shaped;
the trim flange extends at least partially between the bolster body and the rear panel, and engages the bolster body to connect the trim assembly to the bolster body;
the rear panel includes a boss recess;
the trim flange includes a boss opening via which the trim flange engages the bolster body;
the first portion, the second portion, and the third portion each include a boss projecting from a rear surface of the bolster body; and
at least one of the bosses is disposed within the boss recess and the boss opening.

19. The seat assembly according to claim 18, wherein:
the rear panel includes a plurality of boss recesses;
the first portion, the second portion, and the third portion each include a plurality of bosses projecting from the rear surface of the bolster body; and
the plurality of bosses are each disposed within a respective one of the plurality of boss recesses.

20. The seat assembly according to claim 18, wherein:
the first portion includes a flange projecting from a rear surface of the first portion; and
the flange is configured to engage and retain a clip via which the bolster body is releasably connectable to the rear panel.

* * * * *